(12) United States Patent
Okugawa

(10) Patent No.: US 8,189,937 B2
(45) Date of Patent: May 29, 2012

(54) LINE-SCANNING CONFOCAL MICROSCOPE APPARATUS

(75) Inventor: Hisashi Okugawa, Yokosuka (JP)

(73) Assignee: Nikon Corporation, Tokyo (JP)

(*) Notice: Subject to any disclaimer, the term of this patent is extended or adjusted under 35 U.S.C. 154(b) by 917 days.

(21) Appl. No.: 11/912,830

(22) PCT Filed: Oct. 16, 2006

(86) PCT No.: PCT/JP2006/320589
§ 371 (c)(1),
(2), (4) Date: Oct. 26, 2007

(87) PCT Pub. No.: WO2007/055082
PCT Pub. Date: May 18, 2007

(65) Prior Publication Data
US 2009/0034062 A1    Feb. 5, 2009

(30) Foreign Application Priority Data
Nov. 11, 2005  (JP) .................. 2005-327343

(51) Int. Cl.
*G02B 21/00* (2006.01)
(52) U.S. Cl. .............. 382/254; 382/100; 359/368
(58) Field of Classification Search .......... 382/100, 382/254, 275; 359/368
See application file for complete search history.

(56) References Cited

U.S. PATENT DOCUMENTS

| | | | |
|---|---|---|---|
| 5,510,894 A | | 4/1996 | Batchelder et al. |
| 5,715,334 A | * | 2/1998 | Peters .......................... 382/254 |
| 5,974,167 A | * | 10/1999 | Reszler ........................ 382/141 |
| 6,388,809 B1 | | 5/2002 | MacAulay |
| 6,526,181 B1 | * | 2/2003 | Smith et al. .................. 382/275 |
| 6,674,572 B1 | | 1/2004 | Scheruebl et al. |
| 7,280,161 B2 | * | 10/2007 | Satou et al. ................... 348/701 |
| 7,551,799 B2 | * | 6/2009 | Rai et al. ...................... 382/275 |
| 2003/0016882 A1 | * | 1/2003 | Riley et al. ................... 382/275 |
| 2006/0012870 A1 | * | 1/2006 | Engelmann et al. .......... 359/385 |

FOREIGN PATENT DOCUMENTS

| | | |
|---|---|---|
| JP | 10-268201 A | 10/1998 |
| JP | H10-268201 * | 10/1998 |
| JP | 2000-275027 A | 10/2000 |

OTHER PUBLICATIONS

Partial English translation of JP 2000-275027 A, Oct. 10, 2000.
Partial English translation of JP 10-268201 A, Oct. 9, 1998.

* cited by examiner

*Primary Examiner* — Stephen R Koziol
(74) *Attorney, Agent, or Firm* — Miles & Stockbridge P.C.

(57) ABSTRACT

A confocal microscope apparatus is capable of obtaining a high confocal effect while detecting an image of a specimen line by line. The confocal microscope apparatus may include an illuminating optical system which illuminates a line-shaped area on a specimen plane in a specimen by collected light, an image-forming optical system which forms an image of light emitted from the specimen plane, a two-dimensional light detector which is placed at a conjugate plane of the specimen plane, a scanning unit which moves the line-shaped area on the specimen plane, and a correcting unit which corrects a pixel signal of a specific line on the two-dimensional light detector having a confocal relation with the line-shaped area based on a pixel signal of a peripheral line of the specific line.

9 Claims, 6 Drawing Sheets

[Fig.1]
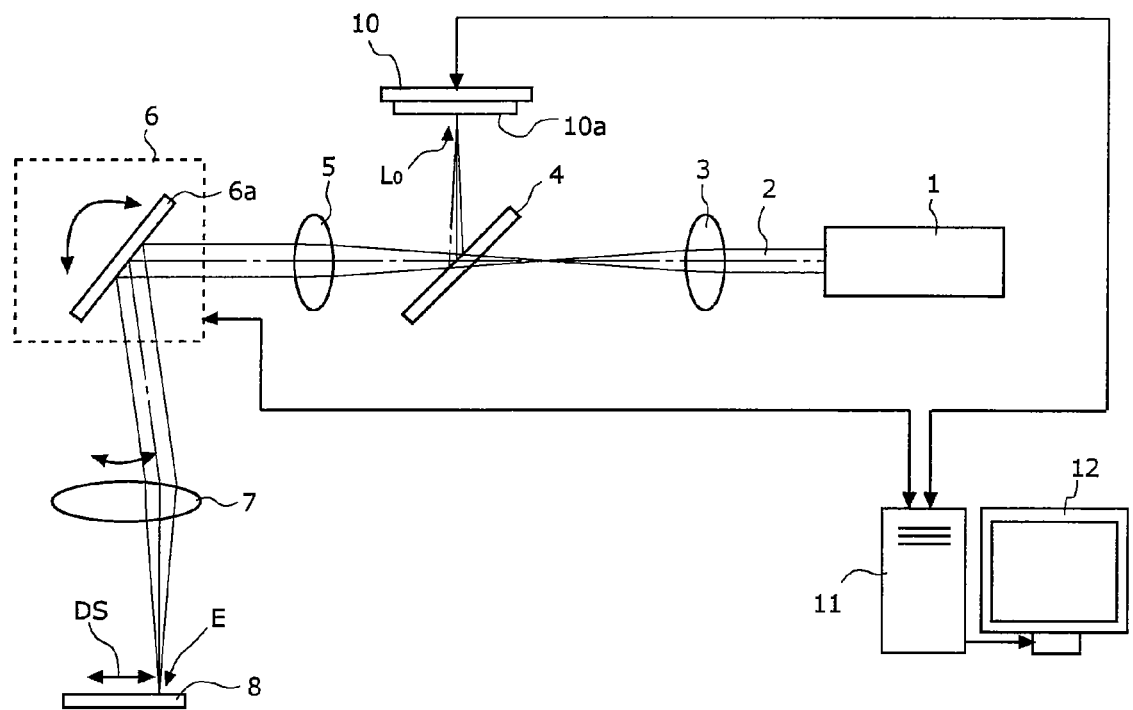
[Fig.2]
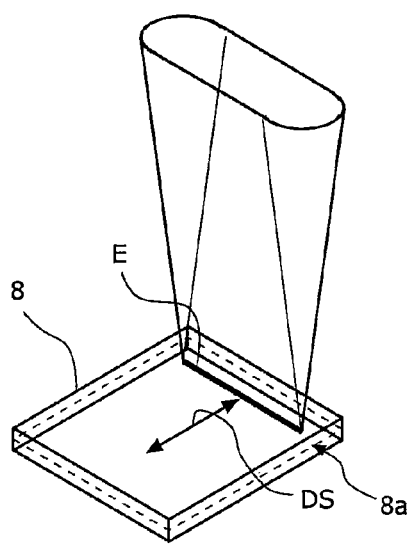

[Fig.3]
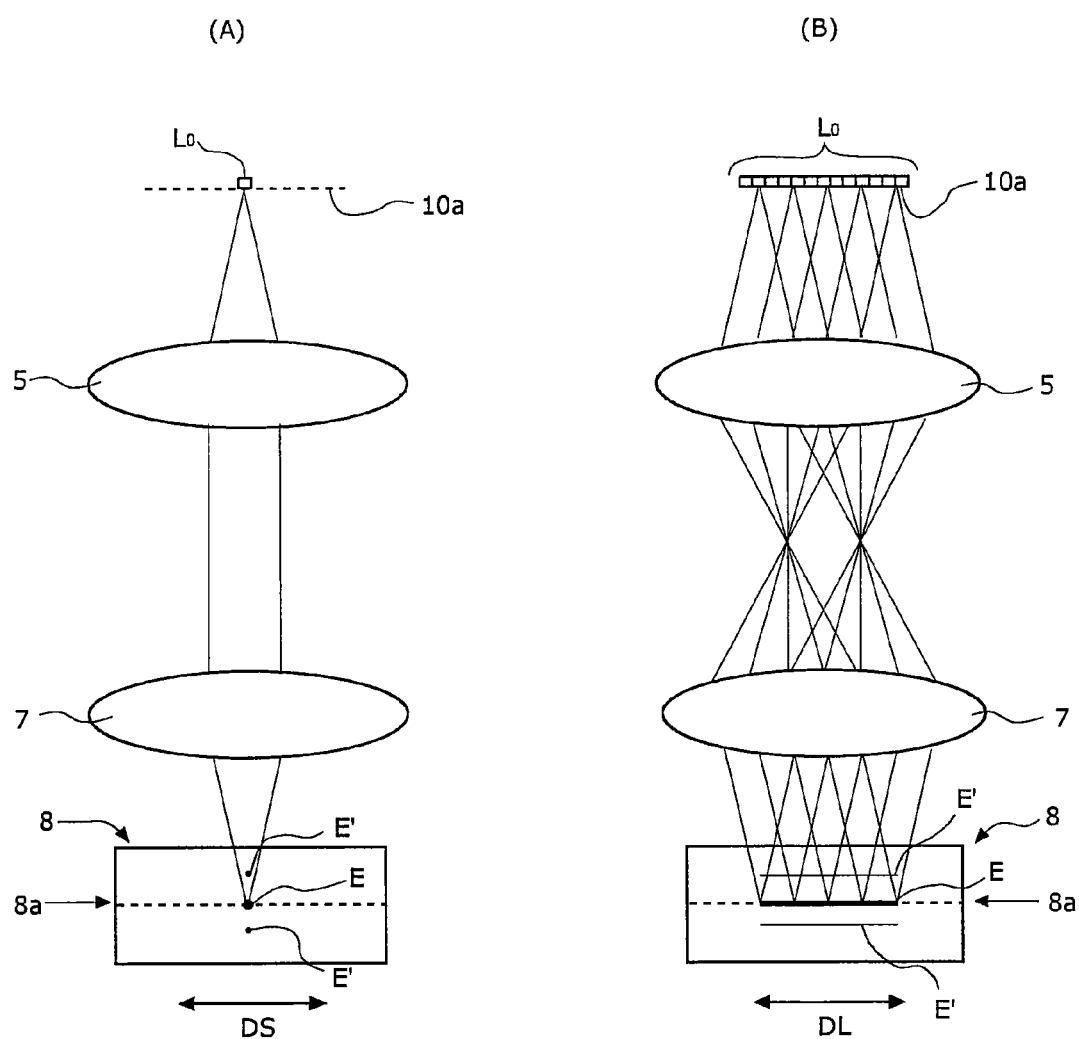

[Fig.4]
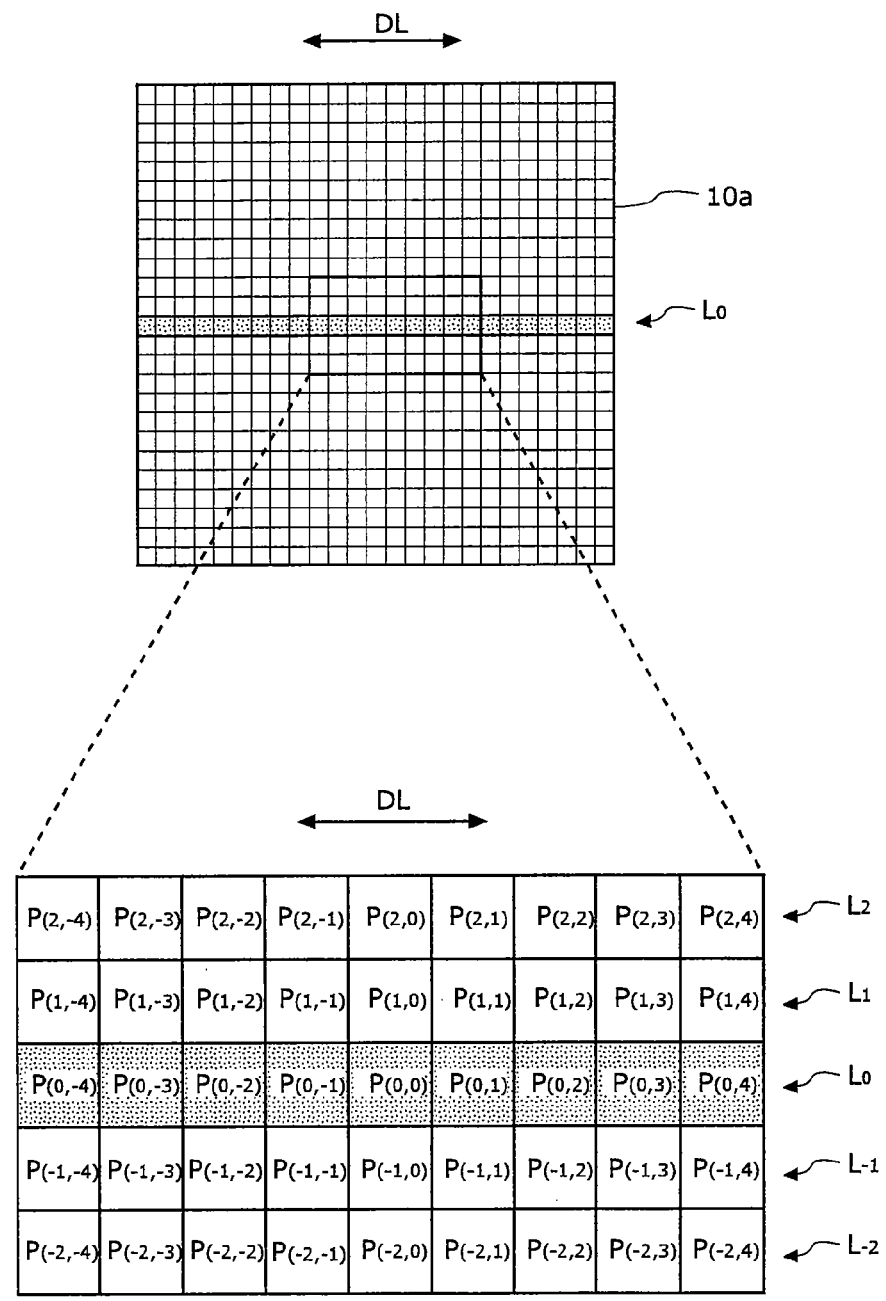

[Fig.5]
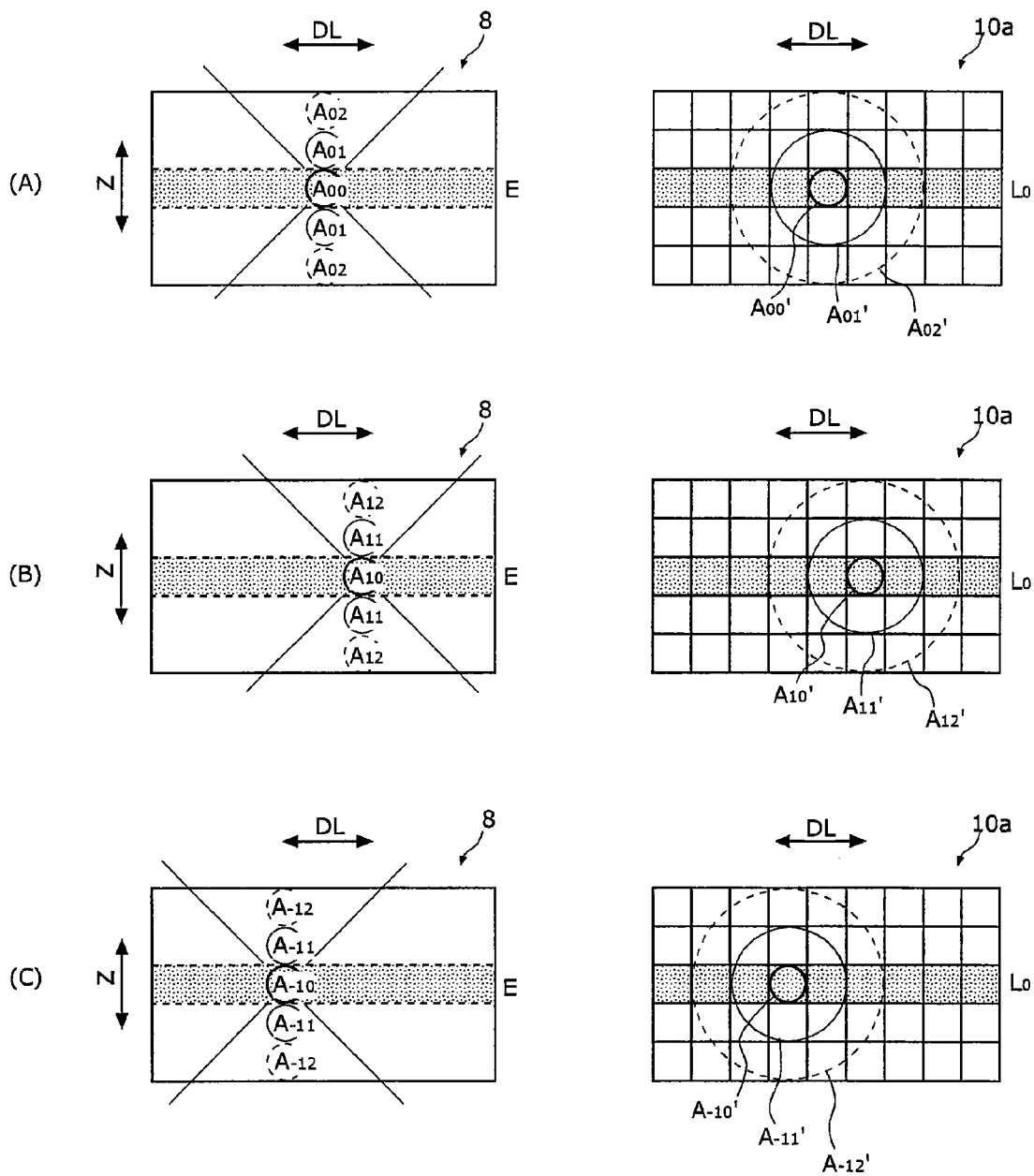

[Fig.6]
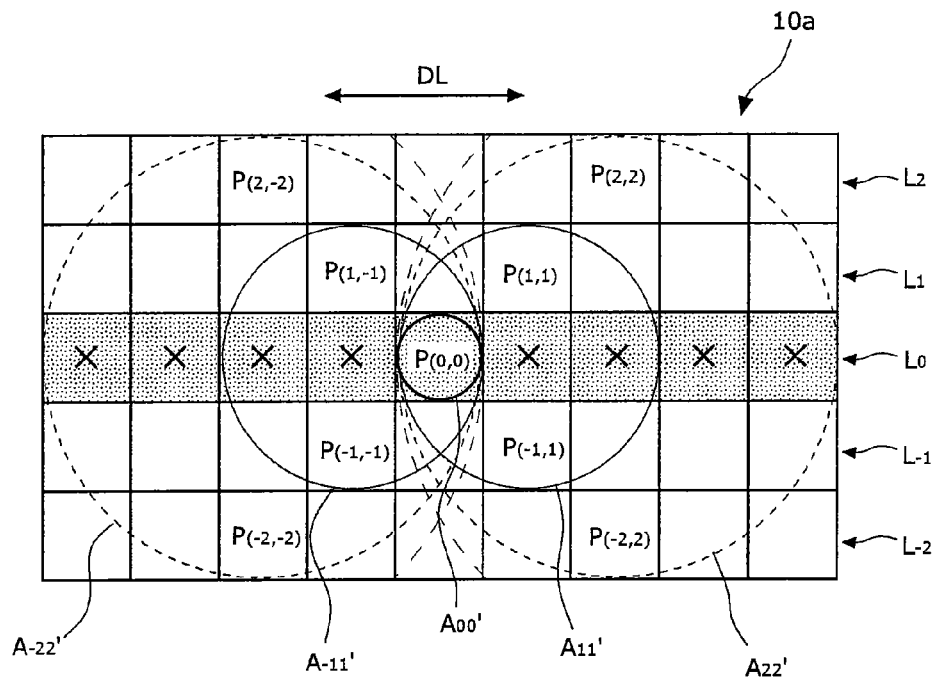
[Fig.7]
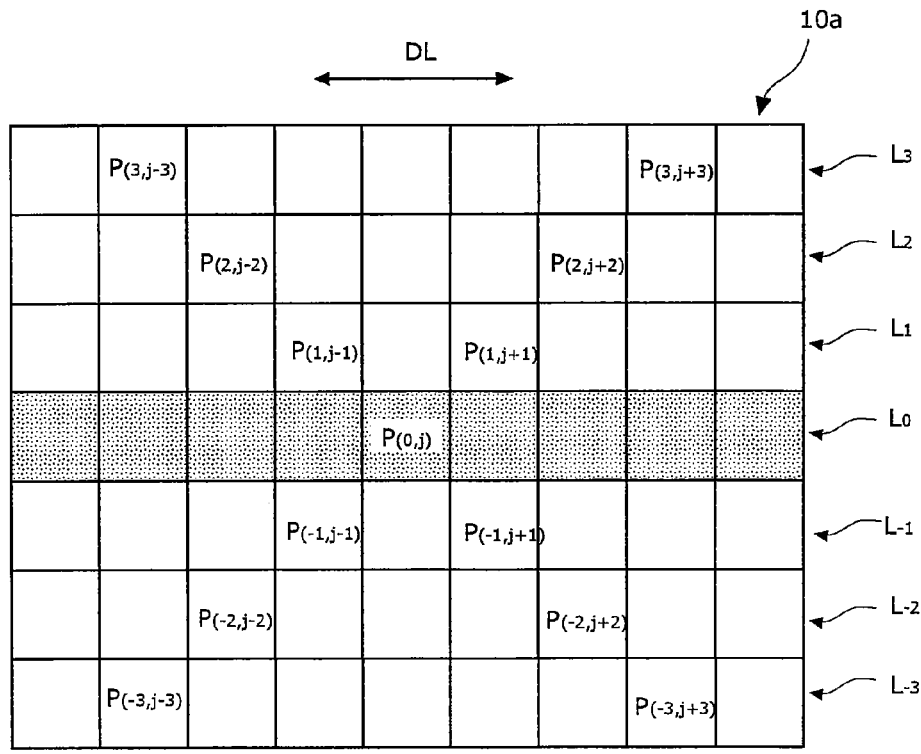

[Fig.8]
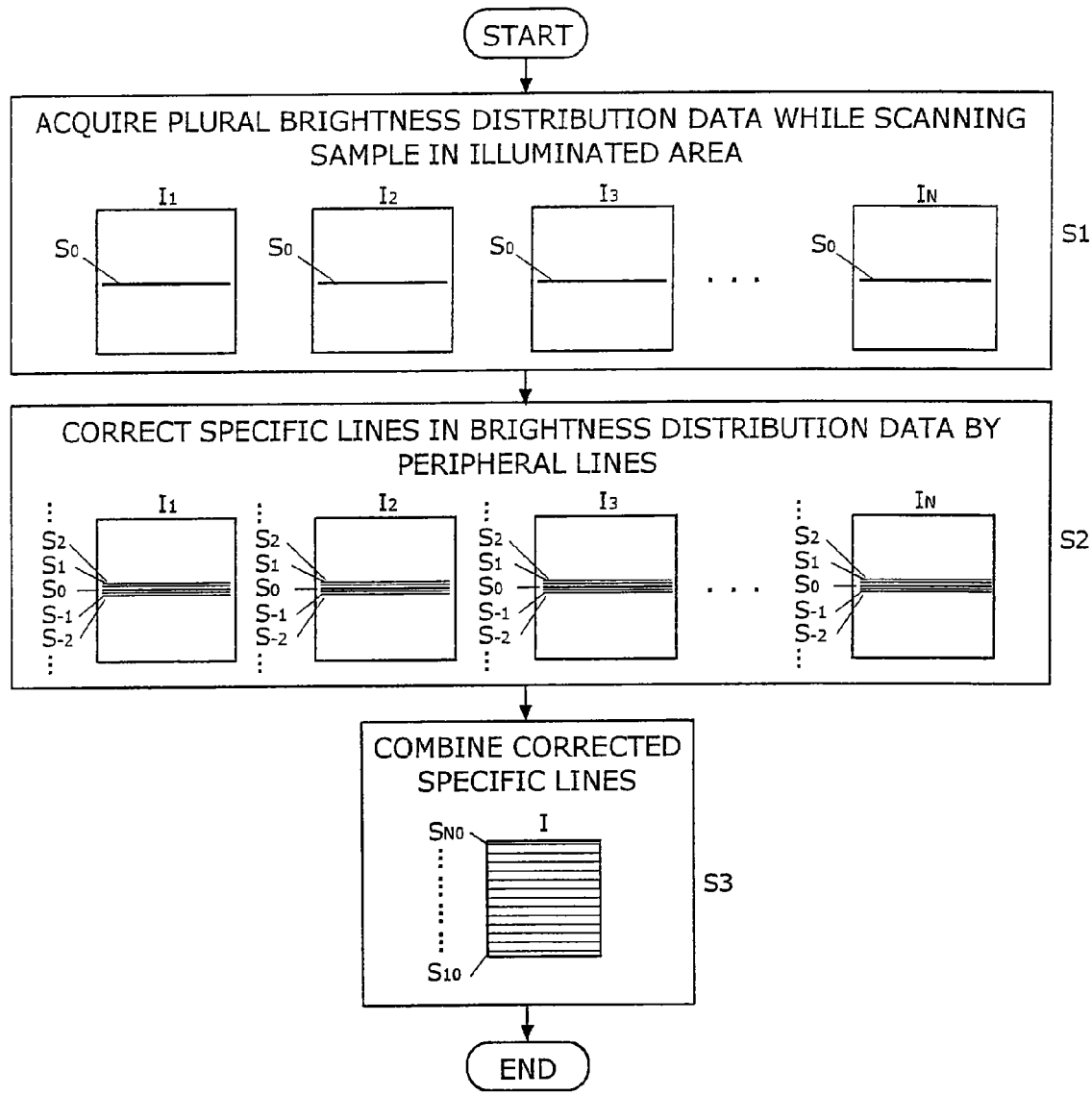

LINE-SCANNING CONFOCAL MICROSCOPE APPARATUS

CROSS-REFERENCE TO RELATED APPLICATION

This application is a 371 of International Application Number PCT/JP2006/320589, filed Oct. 16, 2006, which claims the priority of Japanese Application Number 2005-327343 filed Nov. 11, 2005.

TECHNICAL FIELD

The present invention relates to a confocal microscope apparatus which detects an image of a specimen line by line.

BACKGROUND ART

Generally, a linescanning confocal microscope apparatus illuminates a sample by illuminating light collected in a line shape and detects light generated in an illuminated area on the sample by a light detector such as a one-dimensional CCD (Patent Document 1 or the like). To acquire a two-dimensional image, it is only required to repeat detection while scanning the sample in the illuminated area. If the detection is performed line by line as just described, the time until two-dimensional image information is acquired can be made shorter than an ordinary confocal microscope apparatus which performs detection point by point.

Patent Document 1: Japanese Unexamined Patent Application Publication No. 2000-275027

DISCLOSURE

Problems to be Solved

However, in a linescanning confocal microscope apparatus, crosstalk regarding a short side direction of an illuminated area is suppressed, but crosstalk regarding a longitudinal direction thereof is not suppressed, so that in observation of a sample distributed in the longitudinal direction, a confocal effect (sectioning resolution in a light axis direction and contrast in a planar direction) cannot be obtained.

Hence, an object of the present invention is to provide a confocal microscope apparatus capable of obtaining a high confocal effect while detecting an image of a specimen line by line.

Means for Solving the Problems

A confocal microscope apparatus of the present invention includes: an illuminating optical system which illuminates a line-shaped area on a specimen plane in a specimen by collected light; an image-forming optical system which forms an image of light emitted from the specimen plane; a two-dimensional light detector which is placed at a conjugate plane of the specimen plane; a scanning unit which moves the line-shaped area on the specimen plane; and a correcting unit which corrects a pixel signal of a specific line on the two-dimensional light detector having a confocal relation with the line-shaped area based on a pixel signal of a peripheral line of the specific line.

Incidentally, it is desirable that in the peripheral line, at least a line adjacent to the specific line be included.

Further, it is recommended that the correcting unit correct a jth pixel signal $S_{(0,j)}$ of the specific line $L_0$ at least based on $(j\pm1)$th pixel signals $S_{(1,j+1)}$, $S_{(1,j-1)}$ of a line $L_1$ shifted by one line from the specific line $L_0$.

Furthermore, the correcting unit may correct the jth pixel signal $S_{(0,j)}$ of the specific line $L_0$ based on $(j\pm k)$th pixel signals $S_{(k,j+k)}$, $S_{(k,j-k)}$ of a line $L_k$ shifted by k lines from the specific line $L_0$ by a following equation.

$$S_{(0,j)} = S_{(0,j)} - (S_{(1,j+1)} + S_{(1,j-1)}) - (S_{(2,j+2)} + S_{(2,j-2)}) - (S_{(3,j+3)} + S_{(3,j-3)}) \ldots$$

Moreover, it is desirable that in the peripheral line, at least two lines adjacent to both sides of the specific line be included.

Further, the correcting unit may correct a jth pixel signal $S_{(0,j)}$ of the specific line $L_0$ at least based on $(j\pm1)$th pixel signals $S_{(1,j+1)}$, $S_{(-1,j+1)}$, $S_{(1,j-1)}$, $S_{(-1,j-1)}$ of two lines $L_1$, $L_{-1}$ shifted by plus or minus one line from the specific line $L_0$.

Furthermore, the correcting unit may correct the jth pixel signal $S_{(0,j)}$ of the specific line $L_0$ based on $(j\pm k)$th pixel signals $S_{(k,j+k)}$, $S_{(-k,j+k)}$, $S_{(-k,j-k)}$, $S_{(-k,j-k)}$ of lines $L_k$, $L_{-k}$ shifted by plus or minus k lines from the specific line $L_0$ by a following equation.

$$S_{(0,j)} = S_{(0,j)} - [(S_{(1,j+1)} + S_{(-1,j+1)})/2 + (S_{(1,j-1)} + S_{(-1,j-1)})/2] -$$
$$[(S_{(2,j+2)} + S_{(-2,j+2)})/2 + (S_{(2,j-2)} + S_{(-2,j-2)})/2] -$$
$$[(S_{(3,j+3)} + S_{(-3,j+3)})/2 + (S_{(3,j-3)} + S_{(-3,j-3)})/2] - \ldots$$

Effect

According to the present invention, a confocal microscope apparatus capable of obtaining a high confocal effect while detecting an image of a specimen line by line is realized.

BRIEF DESCRIPTION OF THE DRAWINGS

FIG. 1 is an overall configuration diagram of the present microscope apparatus;

FIG. 2 is a diagram showing a state in which a sample 8 is illuminated in a magnified form;

FIG. 3 schematically depicts a light path from the sample 8 to an imaging plane 10a;

FIG. 4 is a schematic diagram of the imaging plane 10a viewed from the front;

FIG. 5 is a diagram explaining crosstalk occurring among pixels in a specific line $L_0$;

FIG. 6 is a diagram showing images which affect some pixel $P_{(0,0)}$ on the specific line $L_0$;

FIG. 7 is a diagram showing a general pixel $P_{(0,j)}$ on the specific line $L_0$ and pixels representing crosstalk components of its pixel signal; and FIG. 8 is an operational flowchart of a computer 11.

DETAILED DESCRIPTION OF THE EMBODIMENTS

First Embodiment

An embodiment of the present invention will be described below with reference to the drawings. This embodiment is an embodiment of a confocal microscope apparatus.

First, the overall configuration of this microscope apparatus will be described.

FIG. 1 is an overall configuration diagram of this microscope apparatus. As shown in FIG. 1, in this microscope apparatus, a laser light source 1, a cylindrical lens 3, a beam splitter 4, a lens 5, a scanner 6, an objective lens 7, a sample (such as an organism sample) 8, a two-dimensional CCD 10, a computer 11, a monitor 12, and so on are placed.

Laser light 2 emitted from the laser light source 1 is collected in a line shape by the cylindrical lens 3. After passing through the beam splitter 4, the laser light 2 is converted into parallel light by the lens 5, reflected by a scanning mirror 6a in the scanner 6, and collected in a line-shaped area (illuminated area) E on the sample 8 via the objective lens 7.

Light generated in the illuminated area E returns to the beam splitter 4 via the objective lens 7, the scanning mirror 6a, and the lens 5. This light is reflected by the beam splitter 4 and forms an image of the illuminated area E at a specific line $L_0$ on an imaging plane 10a of the two-dimensional CCD 10. The two-dimensional CCD 10 detects a brightness distribution of the imaging plane 10a to generate brightness distribution data and sends it to the computer 11.

Incidentally, the scanner 6 can change a placement angle of the scanning mirror 6a and moves the illuminated area E on the sample 8 in a short side direction (scanning direction) DS thereof. When the illuminated area E moves on the sample 8 as just described, an image of a different line on the sample 8 is projected on the specific line $L_0$ of the two-dimensional CCD 10.

Further, the laser light source 1, the scanner 6, the two-dimensional CCD 10, and so on are controlled by the computer 11. For example, the computer 11 performs control processing of controlling the two-dimensional CCD 10 to acquire the brightness distribution data while controlling the scanner 6 to scan the sample 8 in the illuminated area E (details of which will be described later). Further, the computer 11 performs arithmetical processing of processing the acquired brightness distribution data to generate a two-dimensional image of the sample 8 (details of which will be described later). Furthermore, the computer 11 also performs conversion processing to display this image on the monitor 12, and the like.

FIG. 2 is a diagram showing a state in which the sample 8 is illuminated in a magnified form. Illuminating light is collected on a specimen plane 8a in the sample 8 and has spreads in an upper layer and a lower layer of the specimen plane 8a. Hence, hereinafter, the illuminated area E on the specimen plane 8a is particularly called an "illuminated line E".

FIG. 3 schematically depicts a light path from the sample 8 to the imaging plane 10a. In FIGS. 3(A), (B), states in which the light path is seen from angles different by 90° are shown.

As shown in FIGS. 3(A), (B), the imaging plane 10a is located at a conjugate plane of the specimen plane 8a, and the specific line $L_0$ of the imaging plane 10a has a confocal relation with the illuminated line E. Light generated at one point on the illuminated line E is collected on the specific line $L_0$ and forms an image of the point on one pixel of the specific line $L_0$. Namely, images of respective points on the illuminated line E are formed on respective pixels of the specific line $L_0$.

However, in actuality, light (flare) is generated also in lines E' in an upper layer and a lower layer of the illuminated line E. Flare generated at one point on the line E' is collected before or behind the specific line $L_0$, so that an blurred image of the point is formed on plural pixels of the specific line $L_0$. Namely, on the respective pixels of the specific line $L_0$, blurred images of respective points on the line E' are overlappingly formed.

As a result, in each pixel of the specific line $L_0$, crosstalk regarding a scanning direction DS does not occur, but crosstalk regarding a line direction DL occurs.

Next, the crosstalk regarding the line direction DL will be described in detail.

FIG. 4 is a schematic diagram of the imaging plane 10a viewed from the front. As shown in FIG. 4, the specific line $L_0$ is located near the center of the imaging plane 10a. In the lower part of FIG. 4, the specific line $L_0$ and part of peripheral lines of the specific line are shown in a magnified form. Hereinafter, as shown in FIG. 4, a line shifted by i lines from the specific line $L_0$ is called a "line $L_i$".

Shown on the left side of FIG. 5 is a schematic diagram of a section of part of the sample 8, and shown on the right side thereof is a schematic diagram of the imaging plane 10a. In FIG. 5, a light axis direction is represented by the symbol Z, and line directions of the illuminated line E and the specific line $L_0$ are represented by the symbol DL.

When some point $A_{00}$ on the illuminated line E forms an image $A_{00}'$ on a minute circular area on the specific line $L_0$ of the imaging plane 10a as shown in FIG. 5(A), points $A_{01}$ in an upper layer and a lower layer of the point $A_{00}$ form a blurred image $A_{01}'$ with the same point as the image $A_{00}'$ as its center and cause crosstalk to pixels within its formation range. Further, points $A_{02}$ in an upper layer and a lower layer of the points $A_{01}$ form a more blurred image $A_{02}'$ with the same point as the image $A_{00}'$ as its center and cause crosstalk to pixels within its formation range.

Namely, points $A_{01}, A_{02}, \ldots$ in an upper layer and a lower layer of the point $A_{00}$ form blurred images $A_{01}', A_{02}', \ldots$ with the same point as the image $A_{00}'$ as their center and cause crosstalk to pixels in their formation ranges. Incidentally, the more blurred the image, the smaller the crosstalk quantity given to one pixel becomes.

The same goes for a different point on the illuminated line E and points in the upper layer and the lower layer (see FIGS. 5(B), (C)). In FIGS. 5(B), (C), as in FIG. 5(A), the same subscripts are given to points A in the sample 8 and the images A' on the imaging plane 10a which correspond to each other.

Next, crosstalk components occurring in a pixel signal of the specific line $L_0$ will be described.

In FIG. 6, attention is paid to some pixel $P_{(0,0)}$ on the specific line $L_0$, and only images which affect the pixel $P_{(0,0)}$ are shown. Incidentally, $P_{(i,j)}$ is a jth pixel of a line $L_i$.

As shown in FIG. 6, the image $A_{00}'$ formed on the pixel $P_{(0,0)}$ and images $A_{11}', A_{-11}', A_{22}', A_{-22}', \ldots$ each of which has its center at a position (mark X) shifted from the pixel $P_{(0,0)}$ in the line direction DL and blurred by its shift quantity affect the pixel $P_{(0,0)}$.

Among them, the image $A_{00}'$ is an image to be detected by the pixel $P_{(0,0)}$ and an image generating a signal component with respect to the pixel $P_{(0,0)}$. The other images $A_{11}', A_{22}', A_{-11}', A_{-22}', \ldots$ generate crosstalk components with respect to the pixel $P_{(0,0)}$.

Here, the crosstalk quantity given to the pixel $P_{(0,0)}$ by the image $A_{11}'$ is regarded as appearing in a pixel signal of a pixel $P_{(1,1)}$ or a pixel $P_{(-1,1)}$ arranged in an oblique direction with respect to the pixel $P_{(0,0)}$.

This is because, firstly, the crosstalk quantities of the pixels $P_{(1,1)}, P_{(-1,1)}$ received from the image $A_{11}'$ are each the same as that of the pixel $P_{(0,0)}$. Secondly, the pixels $P_{(1,1)}, P_{(-1,1)}$ exist on lines off the specific line $L_0$, and hence have no signal component.

By thinking in the same way, the crosstalk quantity given to the pixel $P_{(0,0)}$ by the image $A_{-11}'$ is regarded as appearing in a pixel signal of a pixel $P_{(1,-1)}$ or a pixel $P_{(-1,-1)}$.

Further, the crosstalk quantity applied to the pixel $P_{(0,0)}$ by the image $A_{22}'$ is regarded as appearing in a pixel signal from a pixel $P_{(2,2)}$ or a pixel $P_{(-2,2)}$.

Furthermore, the crosstalk quantity given to the pixel $P_{(0,0)}$ by the image $A_{-22}'$ is regarded as appearing in a pixel signal of a pixel $P_{(2,-2)}$ or a pixel $P_{(-2,-2)}$.

Accordingly, pixel signals $S_{(1,1)}$, $S_{(-1,1)}$, $S_{(1,-1)}$ $S_{(-1,-1)}$, $S_{(2,2)}$, $S_{(-2,2)}$, $S_{(2,-2)}$, $S_{(-2,-2)}$, ... of the pixels $P_{(1,1)}$, $P_{(-1,1)}$, $P_{(1,-1)}$ $P_{(-1,-1)}$, $P_{(2,2)}$, $P_{(-2,2)}$, $P_{(2,-2)}$, $P_{(-2,-2)}$, ... represent crosstalk components contained in a pixel signal $S_{(0,0)}$ of the pixel $P_{(0,0)}$.

Incidentally, the $P_{(1,1)}$ and the $P_{(-1,1)}$, the pixel $P_{(1,-1)}$ and the pixel $P_{(-1,-1)}$, and the like have a symmetrical relation with respect to the specific line $L_0$, so that in principle, they should output the same pixel signal. If a difference occurs between the two pixel signals, it is due to the influence of noise. Accordingly, a mean value (mean pixel signal) of the two pixel signals more accurately represents the crosstalk component.

Further, the larger the blur quantity of one image A', the smaller the crosstalk quantity given to one pixel by this image A' becomes, so that out of the pixels $P_{(1,1)}$, $P_{(-1,1)}$, $P_{(1,-1)}$ $P_{(-1,-1)}$, $P_{(2,2)}$, $P_{(-2,2)}$, $P_{(2,-2)}$, $P_{(-2,-2)}$, ..., a pixel on a line closer to the specific line $L_0$ represents a more dominant crosstalk component with respect to the pixel $P_{(0,0)}$.

Moreover, the above description applies to each of pixels on the specific line $L_0$. In FIG. 7, a general pixel $P_{(0,j)}$ on the specific line $L_0$ and pixels representing crosstalk components contained in a pixel signal $S_{(0,j)}$ of the pixel $P_{(0,j)}$ are shown using a general pixel number "j". Out of these pixels, an average pixel signal of two pixels symmetrical with respect to the specific line $L_0$ more accurately represents the crosstalk component. Further, a pixel on a line closer to the specific line $L_0$ represents a more dominant crosstalk component with respect to the pixel $P_{(0,j)}$.

Next, based on the above, the operation of the computer 11 of this microscope apparatus will be described in detail.

FIG. 8 is an operational flowchart of the computer 11. Respective steps will be sequentially described.

(Step S1)

The computer 11 synchronously controls the scanner 6 and the two-dimensional CCD shown in FIG. 1, and while scanning the sample 8 in the illuminated area E, acquires brightness distribution data when the illuminated area E is on respective lines on the sample 8, respectively (step S1). N brightness distribution data acquired here are taken as $I_1$, $I_2$, $I_3$, ..., $I_N$ in order of acquisition.

A specific pixel signal string $S_0$ contained in each of the brightness distribution data $I_1$, $I_2$, $I_3$, ..., $I_N$ is a pixel signal string from the above specific line $L_0$. Information on lines different from one another on the sample 8 is reflected in the pixel signal string $S_0$ of the brightness distribution data $I_1$, the pixel signal string $S_0$ of the brightness distribution data $I_3$, the pixel signal string $S_0$ of the brightness distribution data $I_3$, ..., the pixel signal string $S_0$ of the brightness distribution data $I_N$.

(Step S2)

The computer 11 refers to the pixel signal string $S_0$ of the brightness distribution data $I_1$ and its peripheral pixel signal strings $S_1$, $S_{-1}$, $S_2$, $S_{-2}$, ... and corrects the former based on the latter. Incidentally, the pixel signal string $S_i$ is a pixel signal string of a line $L_i$, and a pixel signal $S_{(i,j)}$ in the pixel signal string $S_i$ is a pixel signal of a pixel $P_{(i,j)}$.

In this correction, each pixel signal $S_{(0,j)}$ in the pixel signal string $S_0$ is corrected by the following equation (1).

$$S_{(0,j)} = S_{(0,j)} - [(S_{(1,j+1)} + S_{(-1,j+1)})/2 + (S_{(1,j-1)} + S_{(-1,j-1)})/2] - \quad (1)$$
$$[(S_{(2,j+2)} + S_{(-2,j+2)})/2 + (S_{(2,j-2)} + S_{(-2,j-2)})/2] -$$
$$[(S_{(3,j+3)} + S_{(-3,j+3)})/2 + (S_{(3,j-3)} + S_{(-3,j-3)})/2] - \ldots$$

In the right side of this equation (1), each term in square brackets is a correcting term.

The first correcting term in equation (1) means a correction by four pixels $P_{(1,j+1)}$, $P_{(-1,j+1)}$, $P_{(1,j-1)}$, $P_{(-1,j-1)}$ on lines $L_1$, $L_{-1}$ shifted by one line from the specific line $L_0$ (see FIG. 7).

The second correcting term in equation (1) means a correction by four pixels $P_{(2,j+2)}$, $P_{(-2,j+2)}$, $P_{(2,j-2)}$, $P_{(-2,j-2)}$ on lines $L_2$, $L_{-2}$ shifted by two lines from the specific line $L_0$ (see FIG. 7).

Similarly, the kth correcting term in equation (1) means a correction by four pixels $P_{(k,j+k)}$, $P_{(-k,j+k)}$, $P_{(k,j-k)}$, $P_{(-k,j-k)}$ on lines $L_k$, $L_{-k}$ shifted by k lines from the specific line $L_0$.

Hence, according to the first correcting term, the most dominant crosstalk components in the pixel signal $S_{(0,j)}$ are removed, according to the second correcting term, the second most dominant crosstalk components in the pixel signal $S_{(0,j)}$ are removed, and according to the kth correcting term, the kth most dominant crosstalk components in the pixel signal $S_{(0,j)}$ are removed.

Further, $(S_{(k,j+k)} + S_{(-k,j+k)})/2$ in the kth correcting term represents a mean pixel signal of two pixels $P_{(k,j+k)}$, $P_{(-k,j+k)}$ symmetrical with respect to the specific line $L_0$. Therefore, according to respective correcting terms in equation (1), various crosstalk components can be removed with high accuracy, respectively.

Incidentally, the number of correcting terms in equation (1) may be set to a small number such as two or one. This is because the larger kth correcting term (that is, the line more distant from the specific line $L_0$) has a weaker correcting effect. If the number of correcting terms can be kept low, the number of pixel signal strings to be referred to by the computer 11 in step S2 and arithmetical loading of the computer 11 can be reduced. On the other hand, it is possible in principle to increase the correcting accuracy as the number of correcting terms is increased, but in actuality, the larger kth correcting term (that is, the line more distant from the specific line $L_0$) has worse S/N, and hence if the number of correcting terms is too many, the correcting accuracy may inversely deteriorate. Therefore, it is desirable to select an optimum value as the number of correcting terms by prior experiment, simulation, and so on.

Similarly, the computer 11 corrects a pixel signal string $S_0$ of the brightness distribution data $I_2$ based on its peripheral pixel signal strings $S_1$, $S_{-1}$, $S_2$, $S_{-2}$, .... Similarly, the computer 11 also corrects pixel signal strings $S_0$ of the brightness distribution data $I_3$, $I_4$, $I_5$, $I_6$, ..., $I_N$.

Incidentally, in this step described above, the corrected pixel signal string $S_0$ obtained from the bright data $I_1$ is replaced with $S_{10}$, the corrected pixel signal string $S_0$ obtained from the bright data $I_2$ with $S_{20}$, ..., and the corrected pixel signal string $S_0$ obtained from the bright data $I_N$ with $S_{N0}$.

(Step S3)

The computer 11 arranges and combines the corrected pixel signal strings $S_{10}$, $S_{20}$, $S_{30}$, ... $S_{N0}$ in this order to create one image data I. This image data I represents a two-dimensional image of the sample 8.

As described above, this microscope apparatus is a lines-canning confocal microscope apparatus, and hence the crosstalk regarding the scanning direction DS does not occur, but the crosstalk regarding the line direction DL occurs. However, in this microscope apparatus, a two-dimensional brightness distribution containing not only the specific line $L_0$ corresponding to the illuminated line E and but also peripheral lines of the specific line is detected, and the former pixel signal is corrected based on the latter pixel signals. The crosstalk regarding the line direction DL is suppressed by this correction. Accordingly, this microscope apparatus can obtain a high confocal effect although it is the linescanning one.

Besides, the computer 11 of this microscope apparatus uses the mean pixel signal of two pixels symmetrical with respect to the specific line $L_0$ in the correction (see equation (1)), so that its correcting accuracy can be increased.

(Others)

Further, in the correction in step S2, equation (2) may be used instead of equation (1).

$$S_{(0,j)} = S_{(0,j)} - (S_{(1,j+1)} + S_{(1,j-1)}) - (S_{(2,j+2)} + S_{(2,j-2)}) - (S_{(3,j+3)} + S_{(3,j-3)}) - \ldots \quad (2)$$

In the right side of this equation (2), each term in parentheses is a correcting term.

The first correcting term in equation (2) means a correction by two pixels $P_{(1,j+1)}$, $P_{(1,j-1)}$ on $L_1$ shifted by one line from the specific line $L_0$ (see FIG. 7).

The second correcting term in equation (2) means a correction by two pixels $P_{(2,j+2)}$, $P_{(2,j-2)}$ on the line $L_2$ shifted by two lines from the specific line $L_0$ (see FIG. 7).

Similarly, the kth correcting term in equation (2) means a correction by two pixels $P_{(k,j+k)}$, $P_{(k,j-k)}$ on the line $L_k$ shifted by k lines from the specific line $L_0$.

Namely, in equation (2), the number of lines used for a correction corresponds to half of that in equation (1). In this equation (2), arithmetic to calculate the mean pixel signal is not included, so that the speed of correcting arithmetic can be increased.

Incidentally, also when equation (2) is used, the number of correcting terms may be set to a small number such as two or one. This is because the larger kth correcting term (that is, the line more distant from the specific line $L_0$) has a weaker correcting effect. If the number of correcting terms can be kept low, the number of pixel signal strings to be referred to by the computer 11 in step S2 and arithmetical loading of the computer 11 can be reduced. On the other hand, it is possible in principle to increase the accuracy as the number of correcting terms is increased, but in actuality, the larger kth correcting term (that is, the line more distant from the specific line $L_0$) has worse S/N, and hence if the number of correcting terms is too many, the correcting accuracy may inversely deteriorate. Therefore, it is desirable to select an optimum value as the number of correcting terms by prior experiment, simulation, and so on.

Further, in this embodiment, no mention is made of the size of the imaging plane 10a, but when the number of lines used for the correction is small, the size of the imaging plane 10a of the two-dimensional CCD may be correspondingly reduced.

For example, when equation (1) is used as a correcting equation and the number of its correcting terms is two, only four lines are used for the correction, and therefore, the imaging plane 10a has only to have five lines of the specific line $L_0$ and lines $L_1$, $L_{-1}$, $L_2$, $L_{-2}$.

Furthermore, when equation (2) is used as the correcting equation and the number of its correcting terms is two, only two lines are used for the correction, and therefore, the imaging plane 10a has only to have three lines of the specific line $L_0$ and lines $L_1$, $L_2$.

Moreover, in this microscope apparatus, the two-dimensional CCD is used as a two-dimensional light detector, but a different type of two-dimensional light detector may be used as long as it can detect a brightness distribution formed simultaneously in the specific line and peripheral lines of the specific line.

Additionally, this microscope apparatus applies the present invention to the linescanning confocal microscope, but even in the case of a spotscanning confocal microscope, the application of the present invention becomes effective as the case may be. It is a case where spotscanning is speeded up and an image of a sample is detected line by line by a charge storage light detector such as a CCD. The charge storage light detector detects the time integral of light intensity incident within a finite time period, and hence, even lights incident on different positions on the CCD at different timings cause crosstalk to each other's signals when their incident timings fall within the charge storage period of the CCD. However, the application of the present invention can suppress this crosstalk.

Further, using this microscope apparatus, fluorescence may be observed. For reference's sake, in the fluorescence observation, it is only required to place a sample labeled by a fluorescent material as the sample 8, place a dichroic mirror as the beam splitter 4, and place a filter as necessary in an appropriate position around the dichroic mirror.

Furthermore, part or all of processing by the computer 11 of this microscope apparatus may be executed by a circuit instead of the computer 11. The use of the circuit makes it possible to shorten the time until a confocal image is displayed.

The many features and advantages of the invention are apparent from the foregoing description. It is to be understood that the invention is not limited to the described embodiments, which are intended to be illustrative and not limiting. As will readily occur to those skilled in the art, numerous changes and modifications are possible in keeping with the principles and spirit of the invention, the scope of which is defined in the appended claims.

The invention claimed is:

1. A line-scanning confocal microscope apparatus, comprising:
   an illuminating optical system which illuminates a specimen plane of a specimen by a line-shaped illumination area;
   an image-forming optical system which forms an image of light emitted from said specimen plane;
   a two-dimensional light detector which is placed at a conjugate plane of said specimen plane and which detects said image formed by the image-forming optical system, the two-dimensional light detector acquiring, at each of a plurality of times, a pixel signal of a specific line of pixels that is in a conjugate relationship with the line-shaped illumination area and a pixel signal of at least one line of pixels peripheral to the specific line of pixels, positions of the line-shaped illumination area on the specimen plane at different ones of the plurality of times being different from each other;
   a scanning unit which moves said line-shaped illumination area in a direction perpendicular to a longitudinal direction of the line-shaped illuminating area on said specimen plane; and
   a correcting unit which corrects for crosstalk in the pixel signal of the specific line of pixels acquired by said two-dimensional light detector at one of said plurality of times based on the pixel signal of the at least one line of pixels peripheral to the specific line of pixels acquired by said two-dimensional light detector at the same one of said plurality of times.

2. The line-scanning confocal microscope apparatus according to claim 1, wherein
for said at least one line of pixels peripheral to the specific line of pixels, at least a line of pixels adjacent to said specific line of pixels is included.

3. The line-scanning confocal microscope apparatus according to claim 2, wherein
said correcting unit corrects for crosstalk in a jth pixel signal, $S_{(0,j)}$, of said specific line of pixels, $L_0$, at least based on $(j\pm 1)$th pixel signals, $S_{(1,j+1)}$, $S_{(1,j-1)}$, of a line of pixels, $L_1$, shifted by one line from the specific line, $L_0$.

4. The line-scanning confocal microscope apparatus according to claim 3, wherein
said correcting unit corrects for crosstalk in the jth pixel signal, $S_{(0,j)}$, of said specific line of pixels, $L_0$, based on $(j\pm k)$th pixel signals, $S_{(k,j+k)}$, $S_{(k,j-k)}$, of a line of pixels, $L_k$, shifted by k lines from said specific line, $L_0$, using the following equation:

$$S_{(0,j)} = S_{(0,j)} - (S_{(1,j+1)} + S_{(1,j-1)}) - (S_{(2,j+2)} + S_{(2,j-2)}) - (S_{(3,j+3)} + S_{(3,j-3)}) \dots .$$

5. The line-scanning confocal microscope apparatus according to claim 1, wherein
for said at least one line of pixels peripheral to the specific line of pixels, at least one line of pixels adjacent to a first side of said specific line and at least one line of pixels adjacent to a second side of said specific line are included.

6. The line-scanning confocal microscope apparatus according to claim 5, wherein
said correcting unit corrects for crosstalk in a jth pixel signal, $S_{(0,j)}$, of said specific line of pixels, $L_0$, at least based on $(j\pm 1)$th pixel signals, $S_{(1,j+1)}$, $S_{(-1,j+1)}$, $S_{(1,j-1)}$, $S_{(-1,j-1)}$, of two lines of pixels, $L_1$, $L_{-1}$, shifted by plus or minus one line from the specific line, $L_0$.

7. The line-scanning confocal microscope apparatus according to claim 6, wherein
said correcting unit corrects for crosstalk in the jth pixel signal, $S_{(0,j)}$, of said specific line of pixels, $L_0$, based on $(j\pm k)$th pixel signals, $S_{(k,j+k)}$, $S_{(-k,j+k)}$, $S_{(k,j-k)}$, $S_{(-k,j-k)}$, of lines of pixels, $L_{+k}$, $L_{-k}$, shifted by plus or minus k lines from said specific line, $L_0$ using the following equation:

$$S_{(0,j)} = S_{(0,j)} - [(S_{(1,j+1)} + S_{(-1,j+1)})/2 + (S_{(1,j-1)} + S_{(-1,j-1)})/2] -$$
$$[(S_{(2,j+2)} + S_{(-2,j+2)})/2 + (S_{(2,j-2)} + S_{(-2,j-2)})/2] -$$
$$[(S_{(3,j+3)} + S_{(-3,j+3)})/2 + (S_{(3,j-3)} + S_{(-3,j-3)})/2] - \dots .$$

8. A line-scanning confocal microscope apparatus, comprising:
an optical system that directs light from a source to simultaneously illuminate a line-shaped portion of a specimen plane of a specimen and images light emitted from the specimen plane;
a scanning unit that changes the portion of the specimen plane illuminated by the optical system;
a two-dimensional detector arranged at a conjugate plane with respect to the specimen plane and that detects the light imaged by the optical system; and
a correcting unit that corrects for crosstalk in a pixel signal for a specific line of pixels detected by said detector based on a pixel signal for at least one peripheral line of pixels detected at a same time by said detector,
wherein the specific line of pixels detected by said detector corresponds to the line-shaped portion of the specimen plane.

9. The line-scanning confocal microscope according to claim 8, wherein the at least one peripheral line of pixels includes at least one line of pixels adjacent to the specific line of pixels.

* * * * *

UNITED STATES PATENT AND TRADEMARK OFFICE
CERTIFICATE OF CORRECTION

| | | |
|---|---|---|
| PATENT NO. | : 8,189,937 B2 | Page 1 of 1 |
| APPLICATION NO. | : 11/912830 | |
| DATED | : May 29, 2012 | |
| INVENTOR(S) | : Hisashi Okugawa | |

It is certified that error appears in the above-identified patent and that said Letters Patent is hereby corrected as shown below:

On the Title Page:

In Item (75), the residence of the inventor should read --Yokosuka (JP)--.

Signed and Sealed this
Thirteenth Day of November, 2012

David J. Kappos
*Director of the United States Patent and Trademark Office*